US009665735B2

(12) United States Patent
Abbott et al.

(10) Patent No.: US 9,665,735 B2
(45) Date of Patent: May 30, 2017

(54) PRIVACY FRACTAL MIRRORING OF TRANSACTION DATA

(71) Applicant: BANK OF AMERICA CORPORATION, Charlotte, NC (US)

(72) Inventors: Robert L. Abbott, Charlotte, NC (US); Jason P. Blackhurst, Charlotte, NC (US); Frederick A. Shahda, Charlotte, NC (US); Alfred Hamilton, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 48 days.

(21) Appl. No.: 14/615,251

(22) Filed: Feb. 5, 2015

(65) Prior Publication Data

US 2016/0232376 A1  Aug. 11, 2016

(51) Int. Cl.
*H04L 29/06* (2006.01)
*G06F 21/62* (2013.01)
*G06F 17/30* (2006.01)

(52) U.S. Cl.
CPC .... *G06F 21/6254* (2013.01); *G06F 17/30598* (2013.01)

(58) Field of Classification Search
CPC ................... G06F 9/00; H04L 29/00
See application file for complete search history.

(56) References Cited

U.S. PATENT DOCUMENTS

| | | | |
|---|---|---|---|
| 2007/0156677 A1* | 7/2007 | Szabo | G06F 17/30522 |
| 2008/0114564 A1* | 5/2008 | Ihara | G06F 17/30321 702/158 |
| 2013/0332987 A1* | 12/2013 | Tenneti | G06F 21/10 726/1 |

* cited by examiner

*Primary Examiner* — Joseph P Hirl
*Assistant Examiner* — Leynna Truvan
(74) *Attorney, Agent, or Firm* — Michael A. Springs; Moore & Van Allen PLLC; Nicholas C. Russell (57) ABSTRACT

The tool to provide anonymous data in response to a request for information is configured to receiving a request for information relating to a population of interest from a user; determining criteria associated with the population of interest, wherein the criteria define an individual representative of the population of interest; determining a characteristic of the individual within one or more categories; classifying the characteristic of the individual into a cluster, the cluster comprising a subset of all possible outcomes for the category; classifying a plurality of individuals from a database into clusters based on the one or more categories; determining a subset of the plurality of individuals that are similar to the individual representative of the population of interest based on the clusters; transforming the characteristics of the individuals in the subset to generate anonymous data responsive to the request for information; and providing the anonymous data to the user.

20 Claims, 3 Drawing Sheets

PRIVACY FRACTAL MIRRORING OF TRANSACTION DATA

FIELD

The present disclosure relates to the field of systems that are used to provide anonymous data in response to request for information.

BACKGROUND

Individuals are concerned about privacy today and do not desire their personal information or identifying information to be shared without their permission. Businesses and other entities, however, often desire feedback from institutions on the results associated with actions taken by the business or entity. For example, a business is often interested in the characteristics of individuals responding to an advertisement.

Institutions would like to provide this information to the business but also retain the privacy of their customers or clients. Previously, institutions may have been able to provide semi-anonymous data by building multiple models at different scales but this approach is labor and data intensive, requires frequent updating and management, and can be overcome by an iterative approach that identifies personally-identifiable information.

Thus, there is a need for a system to provide anonymous data in response to a request for information.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer program products, and methods are described herein for an application and system that provides anonymous data in response to a request for information, wherein the request has the potential to disclose personally-identifiable information.

In various aspects, a system, computer program product, and computer-implemented method are provided for providing anonymous data in response to a request for information. The system, computer program product, and computer implemented method are configured to: receive a request for information relating to a population of interest from a user; determining criteria associated with the population of interest, wherein the criteria define an individual representative of the population of interest; determine a characteristic of the individual within one or more categories; classify the characteristic of the individual into a cluster, the cluster comprising a subset of all possible outcomes for the category; classify a plurality of individuals from a database into clusters based on the one or more categories; determine a subset of the plurality of individuals that are similar to the individual representative of the population of interest based on the clusters; transform the characteristics of the individuals in the subset to generate anonymous data responsive to the request for information; and provide the anonymous data to the user.

In an embodiment, the system, computer program product, and method are further configured to order the clusters of individual based on a magnitude of each cluster and a distribution selected from the group consisting of a normal distribution, an exponential distribution, and a Poisson distribution; and determine a function that represents the individuals in the subset using a zeta function.

In some embodiments, the system, computer program product, and method further comprise determining the characteristic of the individual within one or more categories by: identifying categories associated with the request for information; accessing a database comprising information associated with the population of interest; and determining the characteristic by comparing the categories associated with the request for information with the information stored in the database.

In an embodiment, the system, computer program product, and method further comprise determining a magnitude of the cluster based on at least one of a number of individuals in the cluster and a transformation based on the number of individuals in the cluster and a value of the characteristic for each individual. In some embodiments, the transformation is a product of the number of individuals in the cluster and the value of the characteristic for each individual.

In a still further embodiment, the system, computer program product, and method further comprise transforming the characteristics of the individuals in the subset to generate anonymous data responsive to the request for information by determining an average for the subset of individuals.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Given the desire for privacy in today's society, individuals are hesitant to allow their personal information to be shared with other people or businesses. Nevertheless, businesses, health care providers, and educational system, among other entities, are often interested in characteristics of individuals meeting certain criteria. For example, a business may be interested in the characteristics of individuals responding to an advertisement in order to better understand or target advertisements for the future. Similarly, health care providers may be interested in who is responding to medication or treatment and the characteristics of those individuals. Providing anonymous data that mirror the reality of individual data but that is not a true representation of reality can improve targeted, predictive modeling while still retaining individual privacy. A system for providing anonymous data in response to a request for such information is therefore advantageous in a variety of fields including marketing, education, and health.

In an embodiment, the system transforms individual data, such as customer data present in financial institution records, by adding to the data and/or modifying the data. In this manner, the transformed data is presented to the user and/or downstream applications and is both responsive to the request for information and anonymous so that the data are compliant with laws, rules, and regulations. The transformation creates formatted data that is extracted from personally-identifiable data. In some embodiments, a key is inserted into the transformed data to confirm that the transformed data are anonymous. In an embodiment, the presence of this key in the transformed data improves or permits the system to send the anonymous data to the user.

Figure 1:
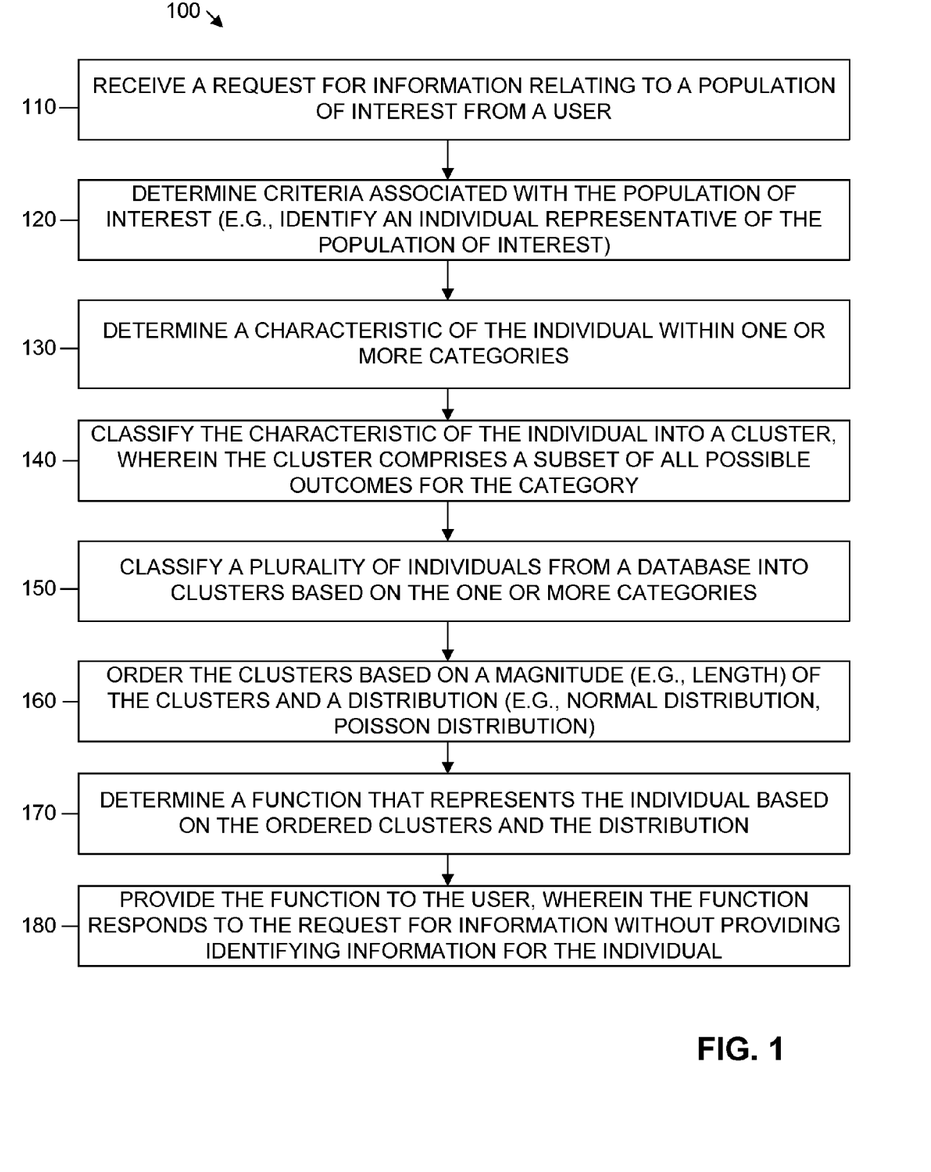
FIG. 1 illustrates a process to provide anonymous data in response to a request for information, in accordance with an embodiment of the invention.

In FIG. 1, a method 100 for providing anonymous data in response to a request for information, wherein the request has the potential to disclose personally-identifiable information, is provided in some aspects. In an embodiment, the method includes receiving a request for information relating to a population of interest from a user; determining criteria associated with the population of interest, wherein the criteria define an individual representative of the population of interest; determining a characteristic of the individual within one or more categories; classifying the characteristic of the individual into a cluster, the cluster comprising a subset of all possible outcomes for the category; classifying a plurality of individuals from a database into clusters based on the one or more categories; determining a subset of the plurality of individuals that are similar to the individual representative of the population of interest based on the clusters; transforming the characteristics of the individuals in the subset to generate anonymous data responsive to the request for information; and providing the anonymous data to the user.

In block 110, in some embodiments, the system receives a request for information relating to a population of interest from a user. For example, a user may be interested in the efficacy of an advertisement and request information from a financial institution regarding the financial institution customers that made a purchase when the advertisement was running. In another example, a user may be interested in receiving information regarding medical outcomes of a group of patients receiving a treatment. In a still further example, a user may be interested in receiving information regarding school choices of students and test scores. In each of these examples, laws, regulations, or policies limit disclosure of information that may identify individuals in the population of interest (i.e., financial institution customers, patients, students). Thus, a method of providing anonymous data associated with these populations of interest would comply with rules and regulations but assist users that are interested in information associated with the population of interest.

In an embodiment, a population of interest is a group of individuals that share one or more characteristics. In some embodiments, the population of interest is defined by an action taken by the individuals in the population. For example, each individual in the population may have made a purchase at a specific time, made a decision regarding matriculating at a school, or participated in a medical study. In some embodiments, the action is relevant to the user searching for information. For example, a merchant may desire to know the characteristics of individuals that made a purchase at a store during a specific period of time in order to gauge the success of a marketing campaign. Similarly, a doctor may desire to know the characteristics of a population of individuals in a medical study who were administered a specific medication. In some embodiments, the population of interest is a group of individuals that are also customers of a financial institution.

In an embodiment, the request is received from a user. The user may be a private individual or corporation, a nonprofit organization, or a governmental agency. In some embodiments, the user is also a customer of the financial institution. For example, a business customer of the financial institution may desire to know which individual customers of the financial institution made a purchase in response to an advertisement campaign.

In an embodiment, the system receives the request electronically. For example, the user may submit the request via an online graphical user interface. The online graphical user interface may allow the user to specify various demographic and/or financial information-related characteristics of the population of interest. For example, the system may provide a list of types of data that the system can use to distinguish populations. Purchases, deposits, and transfers may all include information that can be used to define a population. In one example, deposits from employers or payor names on checks may be used to generate a population of individuals that work at or receive funds from a specific entity.

In some embodiments, the request comprises criteria for individuals in the population of interest. The criteria may be used to define the population. The criteria may be obligatory or aspirational when defining the population. In other words, in some embodiments, an individual must meet the criteria in order to be considered part of the population. In another embodiment, an individual should meet or come close to meeting the criteria to be considered part of the population. The criteria may be numerical (e.g., a minimum account balance or transaction amount), binary (e.g., the user is a home owner or the user is not a home owner), categorical (e.g., city of residence), ordinal (e.g., stages of cancer), geographic (e.g., location, proximity), temporal (e.g., time, elapsed time, date), or the like.

Providing information in response to the request for information would traditionally provide data that could be reverse-engineered and allow the identity of one or more individuals in the population to be determined. For example, an iterative approach could be used to identify a single individual in the population and associate that individual with personal information (e.g., financial account data, medical records, educational records, political records). In contrast, the disclosure herein discloses a system and method that provides information in response to the request for information, wherein the information is anonymous but still responds to the request for information.

In block 120, in some embodiments the system determines criteria associated with the population of interest. In a first embodiment, the system determines the criteria by receiving them from the user. In a second embodiment, the system determines the criteria by evaluating the request and generating criteria that when met would fulfill the request. For example, a merchant may request information on all individuals that purchased during a sale period. The system determines the criteria as being anyway that had a purchase transaction at the merchant during a specific time period. In some embodiments, the criteria are determined based on a combination of being received from the user and being determined in order to meet the request.

In some embodiments, the system identifies an individual representative of the population of interest in order to determine the criteria. In some embodiments, the individual meets all of the criteria requested by the user when submitting the request for information. For example, the user may have requested information on how many people purchased an item on a specific date between a certain time and for a certain amount (e.g., a range for the transaction amount). The individual representative of the population of interest will be selected by the system based on the individual meeting all of these criteria. In some embodiments, the system evaluates a database of individuals, such as a financial institution database comprising transaction history data, to identify the individual.

In an embodiment, no individual in the database meets 100% of the criteria selected by the user. In this situation, the system selects an individual that most closely meets the criteria selected by the user. For example, the system may select an individual that meets the location and time requirement but is outside the range for transaction amount. The system will, in this example, select an individual that is closest to the transaction amount range. In some embodiments, the user provides a hierarchy of importance to the different criteria used to define the population of interest. For example, in the context of educational decisions, the user may indicate that the hierarchy of criteria from most important to least important are test score, grade point average, legacy, in-person visit. In this way, if no individual in the database perfectly meets the criteria then the system will first attempt to identify an individual that meets all of the criteria except for the least important criteria (e.g., in-person visit).

In some embodiments, the system accesses public information regarding users to identify the individual or supplement information from the database. For example, the system may access social media sites to determine whether an individual is a fan of or likes a specific merchant.

In block 130, in some embodiments the system determines a characteristic of the individual within one or more categories. As used herein, a characteristic is facet associated with the behavior, account history, or demographics of the individual. For example, the characteristic may be the frequency with which the individual makes a purchase at a merchant, the average time between purchases, the percentage of time the individual votes early in elections, or the number of times a week the individual exercises. As will be discussed, the categories determined by the system will vary based on the request for information and, in some embodiments, be directly relevant to the request for information. For example, the number of times a week that the individual exercises may not be relevant to a request for information regarding individuals that made a purchase during a sale.

Examples of account history characteristics include balances, purchase or return history, contributions to accounts (e.g., retirement savings, auto-deposit of paychecks), specific types of transactions (e.g., student loans, mortgage payment), and the like.

Examples of demographic characteristics include location, age, income, home ownership status, family status (e.g., married, divorced, children), educational level, employment status, and the like.

In an embodiment, the system determines the characteristic of the individual by accessing records associated with the individual. For example, a financial institution may have records associated with the financial transaction history and the demographics of the individual. Behavioral characteristics may be determined from the transaction history. As discussed, in some embodiments the characteristics are selected based on their relevance to the request. In some embodiments, however, the system determines characteristics that are not directly relevant to the request. For example, the system may conduct a multivariate analysis (e.g., principle components analysis) to determine which of the characteristics are associated with the request for information (e.g., response to medical treatment or the like). In this example, characteristics that may not appear to be directly relevant are identified by the system as associated with the response variable and determined by the system. Without wishing to be bound by theory, in some embodiments these characteristics may co-vary with variables that are relevant but not measured.

In block 140, in some embodiments the system classifies the characteristic of the individual into a cluster, wherein the cluster comprises a subset of all possible outcomes for the category. As used herein, a cluster is a grouping of ranges or values for the characteristic. For example, if an individual is 37 years old, the cluster may classify the individual into a cluster of from 30-40 years old. In some embodiments, the cluster is a value or set of values from a categorical or binary grouping. For example, place of residence may include U.S. state as a characteristic. States in the southeastern United States (e.g., North Carolina, South Carolina, and Georgia) may be grouped together into a cluster.

In an embodiment, the cluster includes a subset of all possible outcomes for the category. For example, all possible outcomes for age include the range of all ages in the population of interest. For example, a medical database may include the age of all individuals in the medical study from age 23 to age 47. Here, the range in ages for the population is 23-47.

The clusters may be defined in a variety of ways and often the method for defining the clusters in the category will depend on the type of category. For example, clusters within age may be defined based on generation (i.e., divide individuals in the category based on which generation they fall into), legally-relevant divisions (e.g., under 18, between 18-65, over 65), natural breaks (e.g., every 5 or 10 years), or the like. In some embodiments, categorical characteristics are grouped based on underlying characteristics of the categories (e.g., state of residence may be grouped based on proximity to one another).

In block 150, in some embodiments the system classifies a plurality of individuals from a database into clusters based on the one or more categories. In an embodiment, the individual identified as representative of the population of interest (e.g., an individual that meets all or most of the criteria) is used to identify other individuals in the database that are similar. These other individuals, in one embodiment, make up a plurality of individuals that can be evaluated in order to provide anonymous data in response to the request for information.

In some embodiments, the characteristics of the plurality of individuals are identified and classified into clusters in the same manner as the representative individual. In one embodiment, all individuals in a database, such as a financial institution database, are identified and classified based on the characteristics. In some embodiments, the individuals in the database are pre-classified into a variety of categories and the system evaluates only those characteristics that are of relevance to the current inquiry. The resulting data include: (1) a single individual representative of the population of interest and categorized into clusters based on the request for information and (2) a plurality of individuals from the database classified into clusters based on the categories used to cluster the single individual. It should be understood that the criteria used to identify the representative individual may differ from the characteristics used to cluster the representative individuals and plurality of individuals from the database.

In block 160, in some embodiments the system orders the clusters based on a magnitude of the clusters and a distribution of the clusters in the population. In an embodiment, the system order the groups of clusters based on the magnitude of the clusters. For example, the individual representative of the population of interest is 42 years old and clustered into the age group of 40-50 years old. The remaining individuals in the population are classified into age groups from 20 (the youngest individual in the population) to 70 (the oldest individual in the population). The system has determined that clusters defined by decades of age generate an appropriate distribution in the population. By clustering the plurality of individuals into decades of age, the resulting population includes 5 individuals from age 20-30, 32 individuals from age 30-40, 27 individuals from age 40-50, 13 individuals from age 50-60, and 2 individuals from age 60-70. The system then orders these clusters by magnitude. For example, the clusters may be ordered by number of individuals in each cluster. In this manner, the clusters are ordered so that the first cluster includes the 2 individuals from age 60-70, the second cluster includes the 5 individuals from age 20-30, the third cluster includes the 13 individuals from age 50-60, the fourth cluster includes the 27 individuals from age 40-50, and the fifth cluster includes the 32 individuals from 30-40.

Figure 3A:
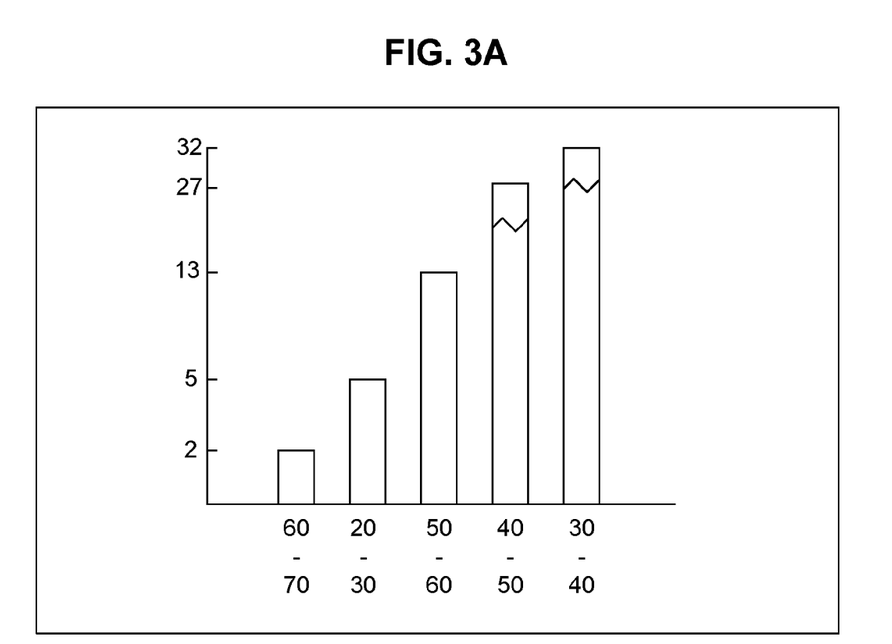
FIGS. 3A and 3B illustrate exemplary fractal distributions, in accordance with embodiments of the invention.

In this manner, the clusters have been ordered based on magnitude and a distribution. In this case, the distribution is from smallest magnitude to largest magnitude and generates a harp-shaped distribution. Turning briefly to FIG. 3A, the clusters ordered in the distribution are provided. As seen in FIG. 3A, the clusters are ordered by magnitude based on number of individuals within each cluster. The smallest cluster is the 60-70 year old group, with only two individuals, and the largest cluster is the 30-40 year old group, with 32 individuals. The representative individual falls within this group.

Figure 3B:
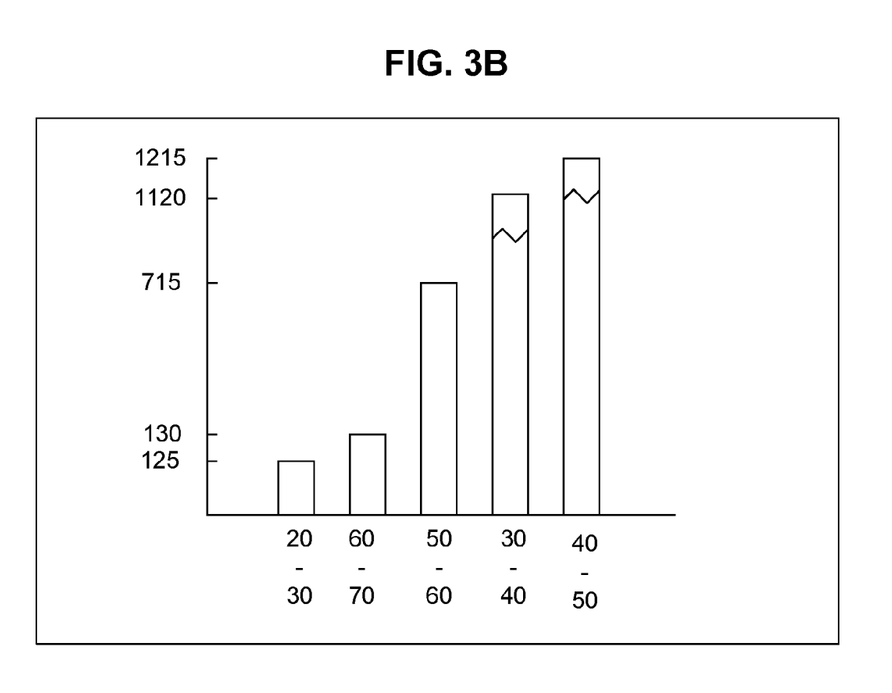

The magnitude of the clusters may be determined in a variety of ways. For example, the sum of the characteristics within the cluster may be used to determine the magnitude. In the above example, the ages of each individual within the cluster can be added together to get the magnitude of the cluster. For ease of calculation, assume that the age of each individual in the cluster is at the midpoint (e.g., 25, 35, 45, 55, and 65). The clusters include 5*25 (age 20-30), 32*35 (age 30-40), 27*45 (age 40-50), 13*55 (age 50-60), and 2*65 (age 60-70). These clusters, when ordered by magnitude determined by the product of the number of individuals in the cluster and their value, are cluster 1: age 20-30 (5*25=125 magnitude), cluster 2: age 60-70 (2*65=130 magnitude), cluster 3: age 50-60 (13*55=715 magnitude), cluster 4: age 30-40 (322*35=1120 magnitude), and cluster 5: age 40-50 (27*45=1215 magnitude). In this example, the order of the clusters based on magnitude from smallest to largest has changed. See FIG. 3B for an example of how the changing method of determining magnitude affects the ordering of clusters. As shown in FIG. 3B, the lowest clusters and highest clusters have changed from 60-70 to 20-30 at the lowest end, and from 30-40 to 40-50 at the highest end. The ordering of the clusters affects the function that will be determined based on them when a zeta function is used for fractal mirroring of the individuals.

As should be understood, there are a variety of ways that magnitude of clusters can be determined. For example, the magnitude can be determined based on pendency (e.g., length of account age), frequency (e.g., number of transactions), or most recent (e.g., time elapsed since last log-in).

The above-example provided an illustration using a distribution from smallest to largest of the clusters based on magnitude, however defined. In some embodiments, however, the distribution is a different type of distribution. For example, the distribution may be a normal distribution, an exponential distribution, a Poisson distribution, or the like. In an embodiment, the shape of the distribution is selected based on the request for information. For example, a normal distribution may be appropriate when a request for information is searching for a characteristic individual. The user is not seeking information on outliers at either end of a distribution but rather the most likely individual in the center of the normal distribution. In another embodiment, the user may be requesting information regarding anomalies or outliers and therefore select an exponential distribution.

In an embodiment, ordering the clusters based on magnitude and distribution is a step in a fractal analysis of the data. A fractal analysis order fractals strings or clusters into a self-similar set (i.e., clustering into groups based on similar characteristics) and then uses a Zeta function to determine an equation that represents the group or a plurality of groups. The benefit of a fractal analysis is that fractal representations are scale-independent. In other words, whether the user is looking at a small scale analysis or a large scale analysis, the representation of the population of interest will accurately portray the population all along the scales. This is in contrast to some methods of providing information on large populations, which use averages, because an average of a large population loses detailed information at finer resolution. The fractal mirroring method disclosed herein is capable of generating formula that defines various portions of the population of interest, such as a small population that closely mirrors the representative individual or a larger population that has greater differences between the population and the representative individual. In some embodiments, the formula describing the smaller populations can be aggregated to generate a formula describing the larger population.

In block 170, in some embodiments the system determines a function that represents the individual based on the ordered clusters and the distribution. In an embodiment, the function represents the individual in an anonymous manner. In other words, the function defines the characteristics of the individual but cannot be used to determine specific personal information about an individual.

In one embodiment, Zeta functions are used to determine a function from the ordered clusters. Zeta functions are known to one of skill in the art and permit a function to be determined based on an ordered set of groups based on a fractal analysis. In an embodiment, the Zeta function is the Riemann zeta function. In some embodiments, a variety of other zeta functions can be used, such as the Barnes zeta function, Hasse-Weil zeta function, Hurwitz zeta function, Matsumoto zeta function, or Shimizo zeta function. In some embodiments, the zeta function to be used is dependent upon the request for information, the distribution, and/or the nature of the data.

In some embodiments, the function is determined based on an average of the characteristics in the group. For example, a mean, a median, a mode, a standard deviation, and/or a range may be used to characterize individuals clustered within a group. For example, if it has been determined that a group of individuals is similar to the representational individual based on clustering analysis, then the average age of that group may be used as a representational age for the anonymous individual.

In an embodiment, multiple characteristics are used to identify individuals from among the plurality of individuals that are similar to the representative individual. In this way, age may be used to find a subset of individuals that are similar to the representative individual, and then state may be further used to identify individuals that are of a similar age and state to the representative individual. This may result in a smaller subset of individuals that are similar to the representative individual. It should be understood that the number of characteristics affects the number of individuals in the group that is characterized to respond to the request for information. Too many characteristics will result in a small group that will be difficult to obscure and therefore in some embodiments the system has a maximum number of characteristics or a minimum number of individuals in the identified group.

In an embodiment, the system deletes or erases the underlying data after the function representative of the population or individual of interest is generated.

In block 180, in some embodiments the system provides the function to the user, wherein the function responds to the request for information without providing identifying information for the individual. In some embodiments, the system provides the function electronically such as via an electronic transfer. In an exemplary embodiment, the system provides a numerical or representational value that responds to the request, e.g., a representational depiction of an anonymous individual responding to the advertisement. The representational depiction may include characteristics that are directly relevant to the request for information, such as amount spent, time of transaction, and the like, but may also include characteristics that are not directly related to the request for information, such as homeowner status and relationship status.

In an embodiment, the response provides anonymous information that is derived from the individuals identified by clustering of self-similar individuals in a group. As discussed, in one embodiment a Zeta function is used to characterize these individuals. In some embodiments, an average is used to characterize these individuals.

It should be understood that the steps disclosed herein are not limiting. Additional steps in the method of providing anonymous data in response to a request for information may be performed. Similarly, the order of the steps disclosed herein is not required. In some embodiments, the order may change based on the needs of the user.

Figure 2:
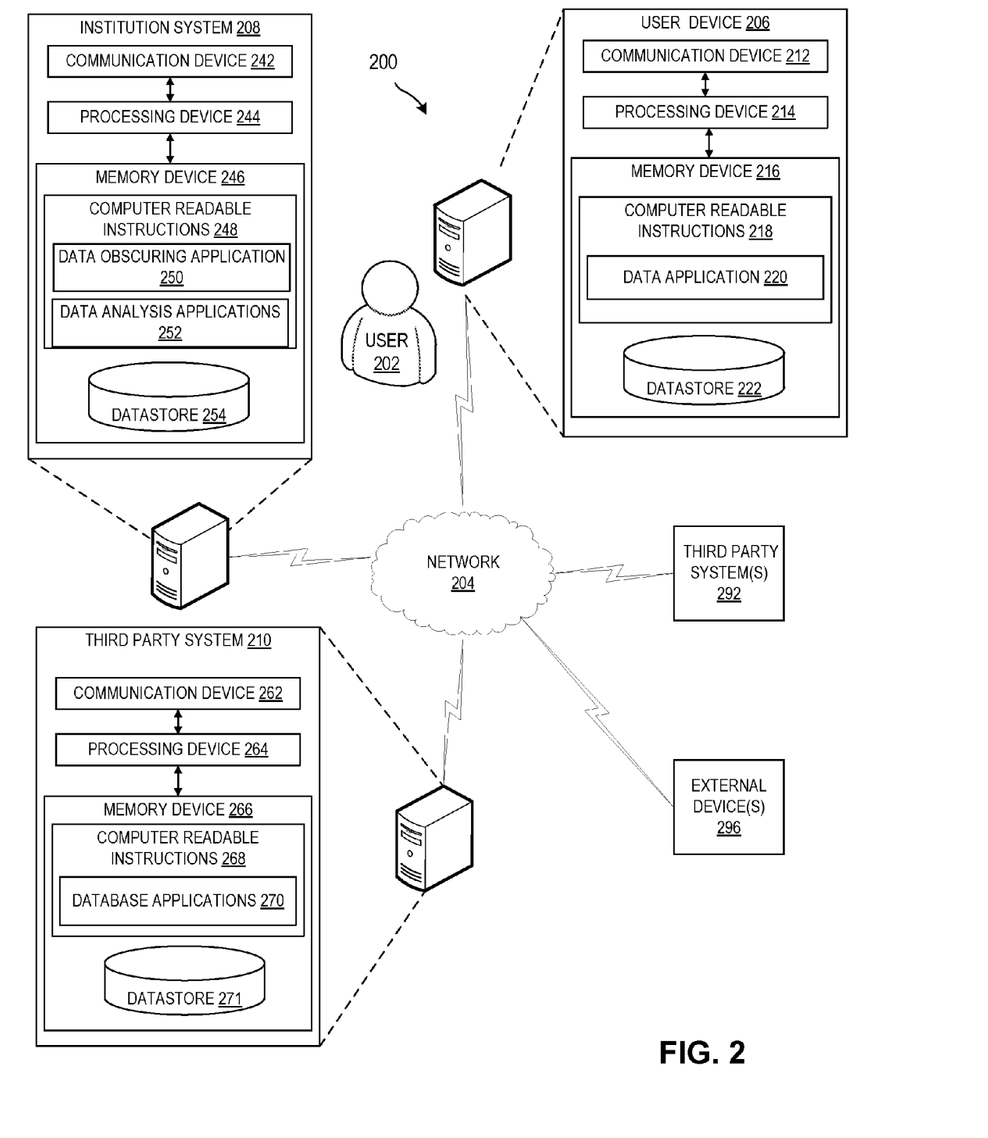
FIG. 2 illustrates a block diagram illustrating a system for providing anonymous data in response to a request for information, in accordance with various embodiments.

Turning now to FIG. 2, a block diagram illustrates an environment 200 for providing anonymous data in response to a request for information. The environment 200 includes a user device 206, an institution system 208, and in some embodiments a third party system or device 210. The user 202 is associated with the user device 206 and can include an owner of the device 144, parties that have authorized access to the device 206, an employee, associate, and the like. The user device 206 can include any type of device such as a computing device, a mobile device, and so forth. The environment 200 further includes one or more other third party systems 292 (e.g., a partner, agent, or contractor associated with the institution system 208), and one or more external devices 296 (e.g., USB flash drives, hard drives, and other removable media). The systems and devices communicate with one another over the network 204 and perform one or more of the various steps and/or methods according to embodiments of the disclosure discussed herein.

The network 204 may include a local area network (LAN), a wide area network (WAN), and/or a global area network (GAN). The network 204 may provide for wireline, wireless, or a combination of wireline and wireless communication between devices in the network. In one embodiment, the network 204 includes the Internet.

The user device 206, the institution system 208, and the third party system 210 each include a computer system, server, multiple computer systems and/or servers or the like. The institution system 208, in the embodiments shown has a communication device 242 communicably coupled with a processing device 244, which is also communicably coupled with a memory device 246. The processing device 244 is configured to control the communication device 242 such that the institution system 208 communicates across the network 204 with one or more other systems. The processing device 244 is also configured to access the memory device 246 in order to read the computer readable instructions 248, which in some embodiments includes data obscuring applications 250 and data analysis applications 252. The data obscuring application 250 may be configured to transform the data from the subset of individuals similar to the representative individual into anonymous data (e.g., via fractal mirroring, via an average). The data analysis application 252 may analyze the data in the database to identify criteria for responding to the request for information. The memory device 246 also includes a datastore 254 or database for storing pieces of data that can be accessed by the processing device 244, such as data on individuals (e.g., financial transaction data, medical data, educational data).

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user device 206 includes a communication device 212 and communicably coupled with a processing device 214, which is also communicably coupled with a memory device 216. The processing device 214 is configured to control the communication device 212 such that the target device 144 communicates across the network 204 with one or more other systems. The processing device 214 is also configured to access the memory device 216 in order to read the computer readable instructions 218, which in some embodiments includes a data application 220 for running specific programs and developing requests for information. The memory device 216 also includes a datastore 222 or database for storing pieces of data that can be accessed by the processing device 214.

The third party system 210 includes a communication device 262 communicably coupled with a processing device 264, which is also communicably coupled with a memory device 266. The processing device 264 is configured to control the communication device 262 such that the third party system 210 communicates across the network 204 with one or more other systems. The processing device 264 is also configured to access the memory device 266 in order to read the computer readable instructions 268, which in some embodiments include database applications 270 for performing various tasks such as providing characteristic data on the plurality of individuals, and so forth. The memory device 266 also includes a datastore 271 or database for storing pieces of data that can be accessed by the processing device 264.

The applications 220, 250, 252, and 270 are for instructing the processing devices 214, 244 and 264 to perform various steps of the methods discussed herein, and/or other steps and/or similar steps. In various embodiments, one or more of the applications 220, 250, 252, and 270 are included in the computer readable instructions stored in a memory device of one or more systems or devices other than the systems 208 and 210 and the user device 206. For example, in some embodiments, the application 220 is stored and configured for being accessed by a processing device of one or more third party systems 292 connected to the network 204. In various embodiments, the applications 220, 250, 252, and 270 stored and executed by different systems/devices are different. In some embodiments, the applications 220, 250, 252, and 270 stored and executed by different systems may be similar and may be configured to communicate with one another, and in some embodiments, the applications 220, 250, 252, and 270 may be considered to be working together as a singular application despite being stored and executed on different systems.

In various embodiments, one of the systems discussed above, such as the institution system 208, is more than one system and the various components of the system are not collocated, and in various embodiments, there are multiple components performing the functions indicated herein as a single device. For example, in one embodiment, multiple processing devices perform the functions of the processing device 244 of the institution system 208 described herein. In various embodiments, the institution system 208 includes one or more of the external systems 296 and/or any other system or component used in conjunction with or to perform any of the method steps discussed herein. For example, the institution system 208 may include a financial institution system, an information technology system, and the like.

In various embodiments, the institution system 208, the third party system 210, and the user device 206 and/or other systems may perform all or part of a one or more method steps discussed above and/or other method steps in association with the method steps discussed herein. Furthermore, some or all the systems/devices discussed here, in association with other systems or without association with other systems, in association with steps being performed manually or without steps being performed manually, may perform one or more of the steps of method 100, or other methods, processes or steps discussed herein or not discussed herein.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for providing anonymous data in response to a request for information, the system comprising:
    a memory device having computer readable program code store thereon; and
    a processing device operatively coupled to the memory device, wherein the processing device is configured to execute the computer readable program code to:
        receive a request for information relating to a population of interest from a user;
        determine criteria associated with the population of interest, wherein the criteria defines a first individual representative of the population of interest;
        determine a characteristic of the first individual within one or more categories, wherein the characteristic of the first individual is based on data associated with the first individual;
        determine multiple clusters, wherein each cluster comprises a subset of all possible outcomes for one of the categories, wherein the cluster comprises a group of values for an age and location of the population of interest;
        classify the first individual into one of the clusters, wherein classifying the first individual is based on the characteristic of the first individual within the one or more categories;
        classify other individuals from a database into one of the clusters, wherein classifying each of the other individuals is based on a characteristic of the other individual within the one or more categories;
        order the multiple clusters into magnitudes from smallest to largest magnitude to generate a harp-shaped distribution presentation;
        determine a subset of the other individuals that are similar to the first individual, wherein the determination is based on the distribution of other individuals among the clusters;
        transform the characteristics of the subset of the other individuals to generate anonymous data responsive to the request for information, wherein the anonymous data is based on the distribution of the subset of the other the individuals among the clusters; and
        provide the anonymous data to the user.

2. The system of claim 1, wherein the processing device is further configured to execute the computer readable program code to:
    order the clusters of individuals based on a magnitude of each cluster and a distribution selected from the group consisting of a normal distribution, an exponential distribution, and a Poisson distribution; and
    determine a function that represents the individuals in the subset using a zeta function.

3. The system of claim 1, wherein the processing device is further configured to execute the computer readable program code to:
    determine the characteristic of the first individual within one or more categories by:
        identifying categories associated with the request for information;
        accessing a database comprising information associated with the population of interest; and
        determining the characteristic by comparing the categories associated with the request for information with the information stored in the database.

4. The system of claim 1, wherein the processing device is further configured to execute the computer readable program code to:
    determine a magnitude of a cluster based on at least one of a number of individuals in the cluster and a transformation based on the number of individuals in the cluster and a value of the characteristic for each individual.

5. The system of claim 4, wherein the transformation is a product of the number of individuals in the cluster and the value of the characteristic for each individual.

6. The system of claim 1, wherein the processing device is further configured to execute the computer readable program code to transform the characteristics of the individuals in the subset of the other individuals to generate anonymous data responsive to the request for information by determining an average for the subset of the other individuals.

7. The system of claim 1, wherein the processing device is further configured to execute the computer readable program code to:
    identify a plurality of characteristics of the first individual;
    classify a subset of the other individuals into clusters based on the plurality of characteristics; and
    determine a maximum number of characteristics, wherein the maximum number of characteristics is determined based on a predetermined minimum permissible number of individuals in the subset.

8. A computer program product for providing anonymous data in response to a request for information, the computer program product comprising at least one non-transitory computer-readable medium having computer-readable program code portions embodied therein, the computer-readable program code portions comprising:

an executable portion configured to receive a request for information relating to a population of interest from a user;

an executable portion configured to determine criteria associated with the population of interest, wherein the criteria define a first individual representative of the population of interest;

an executable portion configured to determine a characteristic of the first individual within one or more categories, wherein the characteristic of the first individual is based on data associated with the first individual;

an executable portion configured to determine multiple clusters, wherein each cluster comprises a subset of all possible outcomes for one of the categories, wherein the cluster comprises a group of values for an age and location of the population of interest;

an executable portion configured to classify the first individual into one of the clusters, wherein classifying the first individual is based on the characteristic of the first individual within the one or more categories;

an executable portion configured to classify other individuals from a database into one the clusters, wherein classifying each of the other individuals is based on a characteristic of the other individual within the one or more categories;

an executable portion configured to order the multiple clusters into magnitudes from smallest to largest magnitude to generate a harp-shaped distribution presentation;

an executable portion configured to determine a subset of the other individuals that are similar to the first individual, wherein the determination is based on the distribution of other individuals among the clusters;

an executable portion configured to transform the characteristics of the subset of the other individuals to generate anonymous data responsive to the request for information, wherein the anonymous data is based on the distribution of the subset of the other the individuals among the clusters; and an executable portion configured to provide the anonymous data to the user.

9. The computer program product of claim 8, wherein the computer-readable program code portions further comprise:

an executable portion configured to order the clusters of individuals based on a magnitude of each cluster and a distribution selected from the group consisting of a normal distribution, an exponential distribution, and a Poisson distribution; and an executable portion configured to determine a function that represents the individuals in the subset using a zeta function.

10. The computer program product of claim 8, wherein the computer-readable program code portions further comprise:

an executable portion configured to determine the characteristic of the first individual within one or more categories by:

identifying categories associated with the request for information;

accessing a database comprising information associated with the population of interest; and determining the characteristic by comparing the categories associated with the request for information with the information stored in the database.

11. The computer program product of claim 8, wherein the computer-readable program code portions further comprise:

an executable portion configured to determine a magnitude of a cluster based on at least one of a number of individuals in the cluster and a transformation based on the number of individuals in the cluster and a value of the characteristic for each individual.

12. The computer program product of claim 11, wherein the transformation is a product of the number of individuals in the cluster and the value of the characteristic for each individual.

13. The computer program product of claim 8, wherein the computer-readable program code portions further comprise:

an executable portion configured to transform the characteristics of the individuals in the subset of the other individuals to generate anonymous data responsive to the request for information by determining an average for the subset of the other individuals.

14. The computer program product of claim 8, wherein the computer-readable program code portions further comprise:

an executable portion configured to identify a plurality of characteristics of the first individual;

an executable portion configured to classify a subset of the other individuals into clusters based on the plurality of characteristics; and an executable portion configured to determine a maximum number of characteristics, wherein the maximum number of characteristics is determined based on a predetermined minimum permissible number of individuals in the subset.

15. A method for providing anonymous data in response to a request for information, the method comprising:

receiving, by a processing device, a request for information relating to a population of interest from a user;

determining, by the processing device, criteria associated with the population of interest, wherein the criteria define a first individual representative of the population of interest;

determining, by the processing device, a characteristic of the first individual within one or more categories, wherein the characteristic of the first individual is based on data associated with the first individual;

determining multiple clusters, wherein each cluster comprises a subset of all possible outcomes for one of the categories, wherein the cluster comprises a group of values for an age and location of the population of interest;

classifying, by the processing device, the first individual into one of the clusters, wherein classifying the first individual is based on the characteristic of the first individual within the one or more categories;

classifying, by the processing device, other individuals from a database into one of the clusters, wherein classifying each of the other individuals is based on a characteristic of the other individual within the one or more categories;

ordering the multiple clusters into magnitudes from smallest to largest magnitude to generate a harp-shaped distribution presentation;

determining, by the processing device, a subset of the other individuals that are similar to the first individual, wherein the determination is based on the distribution of other individuals among the clusters;

transforming, by the processing device, the characteristics of the subset of the other individuals to generate anonymous data responsive to the request for information, wherein the anonymous data is based on the distribution of the subset of the other the individuals among the clusters; and providing, by the processing device, the anonymous data to the user.

16. The method of claim 15, wherein the method further comprises:

ordering the clusters of individuals based on a magnitude of each cluster and a distribution selected from the group consisting of a normal distribution, an exponential distribution, and a Poisson distribution; and determining a function that represents the individuals in the subset using a zeta function.

17. The method of 15, wherein the method further comprises determining the characteristic of the first individual within one or more categories by:

identifying categories associated with the request for information;

accessing a database comprising information associated with the population of interest; and determining the characteristic by comparing the categories associated with the request for information with the information stored in the database.

18. The method of 15, wherein the method further comprises:

determining a magnitude of a cluster based on at least one of a number of individuals in the cluster and a transformation based on the number of individuals in the cluster and a value of the characteristic for each individual.

19. The method of 18, wherein the transformation is a product of the number of individuals in the cluster and the value of the characteristic for each individual.

20. The method of claim 15, wherein the method further comprises transforming the characteristics of the individuals in the subset of the other individuals to generate anonymous data responsive to the request for information by determining an average for the subset of the other individuals.

* * * * *